Jan. 23, 1951  V. E. CARBONARA  2,538,828
BINOCULAR OBJECTIVE MOUNTING AND ADJUSTMENT
Filed April 23, 1947

INVENTOR.
VICTOR E. CARBONARA
BY
ATTORNEY

Patented Jan. 23, 1951

2,538,828

UNITED STATES PATENT OFFICE 2,538,828

BINOCULAR OBJECTIVE MOUNTING AND ADJUSTMENT

Victor E. Carbonara, Manhasset, N. Y., assignor to Square D Company, Detroit, Mich., a corporation of Michigan Application April 23, 1947, Serial No. 743,317

6 Claims. (Cl. 88—34)

1

This invention relates to mounting and adjusting means for the objective lenses of binoculars to provide for focusing the binocular on the scene or object to be viewed.

It has for its object the provision of simple and effective objective mounting and adjusting means wherein rotation of an adjusting knob effects rectilinear movement of the holders of the objective lenses with means inter-engaging with a stationary element to absorb longitudinal thrust and provide for the rectilinear movement of the objective holders upon rotative movement of the adjusting knob.

Other objects and features of the invention will be readily apparent to those skilled in the art from the specification and appended drawings illustrating certain preferred embodiments in which.

Figure 1:
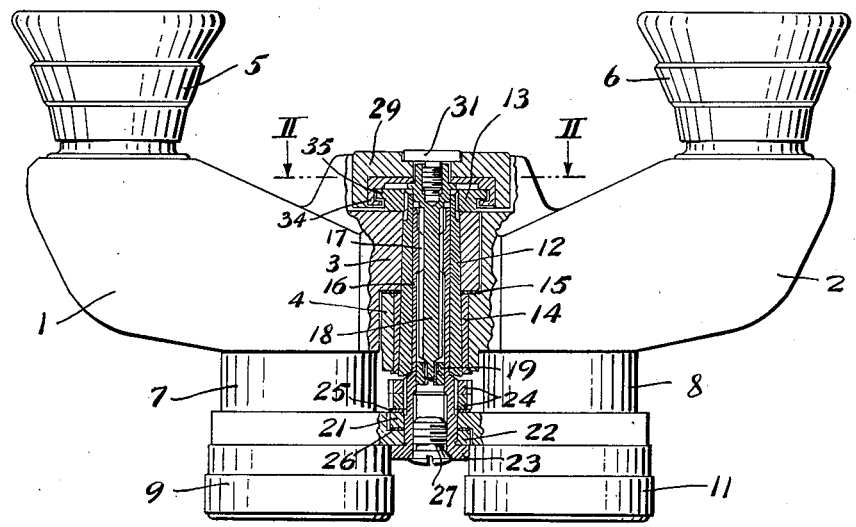
Figure 1 is a view partly in section and partly in elevation showing the objective mounting and adjusting means according to the present invention.
Figure 2:
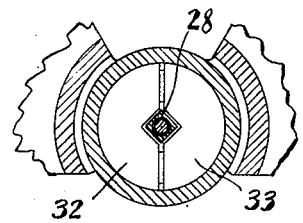
Figure 2 is a detailed sectional view on the line II—II of Figure 1.

The binocular specifically shown in the drawing comprises a pair of main body portions 1 and 2 within which the optical prisms (not shown) are disposed. These main body portions are complementary and have integral hubs 3 and 4 serving to mount them for relative rotary motion to adjust the spacing between the eye pieces 5 and 6 carried at one side of the main body portions. The opposite side of the body portions 1 and 2 has cylindrical barrel portions 7 and 8 about which are slideably disposed the holders 9 and 11 carrying the objective lenses of the binocular.

Through the hubs 3 and 4 extends a sleeve 12 having an exterior tapered surface which is forced into a tight fit within the hub 3 by means of a nut 13. Between the hub 4 and the sleeve 12 is disposed a bearing sleeve 14 which with the friction washer 15 provides for the relative rotary motion between the body portions of the binocular. Within the sleeve 12 there is disposed a reciprocable sleeve 16 threaded over a portion only of its interior surface at 17 which portion threadedly engages an exteriorly threaded pin 18 extending within the sleeve 16. Upon the interior end of the pin 18 is mounted a limiting nut 19 of a size larger than the inner diameter of the threaded portion 17 so that engagement of this threaded portion with the side of the nut 19 will limit the extended position of the holders 9 and 11.

2

The holders 9 and 11 are provided with hubs 21 and 22 mounted at the end of the sleeve 16 between the head 23 and nuts 24. Friction washers 25 and 26 facilitate relative rotary motion between the hubs of the objective holders. The stud 27 closes the opening at the end of the sleeve 16 which provides access to the nut 19.

The outer end of the pin 18 is rectangular as indicated at 28 to be received within a complementary opening in a cup-shaped adjusting knob 29 maintained on the pin by the stud 31. Within the cup-shaped knob 29 are disposed a pair of complementary elements 32 and 33 which are provided with internal grooves 34 embracing a flange 35 on the nut 13. The members 32 and 33 are separate from the knob 29 and are individually mounted in place before the knob is mounted on the pin with the knob when in place retaining the complementary members with their groove 34 engaging the flange 35 of the nut 13.

To effect movement of the objective holders 9 and 11 to focus the binocular, the knob 29 is rotated to rotate pin 18 which in turn through its threaded engagement with the sleeve 16 at the portion 17 effects longitudinal movement of the sleeve 16 within the sleeve 12 to extend and retract the objective holders. It will be seen that the engagement of the members 32 and 33 with the flange 35 on the stationary nut 13 absorbs the reactive thrust of the pin 18 and thus permits rotary movement of the pin while preventing rectilinear movement thereof. The sleeve 16 cannot rotate as it is pinned or otherwise secured to the hub 22 of objective holder 9. Hence, rotation of pin 18 must effect longitudinal movement of the sleeve 16 to move the binocular objectives.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a binocular, a pair of complementary body portions having hubs about the axes of which they are adapted to rotate, a first sleeve extending through said hubs and mounting said body portions for relative rotary motion, a second sleeve extending through said first sleeve and longitudinally movable relative thereto, a pair of objective holders hingedly mounted on said second sleeve, a pin threaded in said second sleeve and having one end extending therebeyond, an adjusting knob mounted on said one end and providing means for rotating said pin, and means providing a flange and groove connection comprising an element on said first sleeve having a flange and a pair of complementary elements mountable on said pin and having interior grooves engaging said flange for preventing longitudinal motion of said pin while permitting rotary movement thereof whereby rotation of said pin by said knob effects longitudinal movement of said second sleeve to move said objective holders relative to said body portions.

2. In a binocular, a pair of complementary body portions having hubs about the axes of which they are adapted to rotate, a first sleeve having an exterior tapered surface extending through said hubs and mounting said body portions for relative rotary motion, a nut on the smaller diameter portion of said sleeve, a second sleeve extending through said first sleeve and longitudinally movable relatively thereto, a pair of objective holders hingedly mounted on said second sleeve, a pin threaded in said second sleeve and having one end extending therebeyond, an adjusting knob mounted on said one end and providing means for rotating said pin, said nut having an exterior circular flange, and means comprising a pair of complementary elements mounted on said pin and having grooves engaging said flange for interconnecting said pin and said nut to prevent longitudinal movement of the pin while permitting rotary movement thereof, whereby rotation of the pin by said knob effects longitudinal movement of said second sleeve to move said objective holders relative to the body portions.

3. In a binocular, a pair of complementary body portions having hubs about the axes of which they are adapted to rotate, a first sleeve having an exterior tapered surface extending through said hubs and mounting said body portions for relative rotary motion, a nut on the smaller diameter portion of said sleeve, a second sleeve extending through said first sleeve and longitudinally movable relatively thereto, a pair of objective holders hingedly mounted on said second sleeve, a pin threaded in said second sleeve and having one end extending therebeyond, an adjusting knob mounted on said one end and providing means for rotating said pin, said nut having an exterior circular flange, and a pair of complementary elements having internal grooves engaging the flange on said nut, said elements being received within and maintained in position by the knob after assembly on the pin, said flange and groove connection permitting rotary movement of the pin while preventing longitudinal movement thereof to effect longitudinal movement of the second sleeve as the pin is rotated.

4. In a binocular, a pair of complementary body portions having hubs about the axes of which they are adapted to rotate, a first sleeve extending through said hubs and mounting said body portions for relative rotary motion, a second sleeve extending through said first sleeve and longitudinally movable relative thereto, a pair of objective holders hingedly mounted on said second sleeve, a pin threaded in said second sleeve and having one end extending therebeyond, an adjusting knob mounted on said one end and providing means for rotating said pin, a stationary element mounted on said first sleeve between said knob and said body portions and having an exterior circular flange, a pair of complementary elements having interior grooves engaging said flange, means connecting said complementary elements to said pin so as to prevent longitudinal movement of the pin while permitting rotary motion thereof, whereby rotation of the pin is accompanied by longitudinal movement of said second sleeve to move the objective holders relative to the body portions.

5. In a binocular, a pair of complementary body portions having hubs about the axes of which they are adapted to rotate, a first sleeve extending through said hubs and mounting said body portions for relative rotary motion, a second sleeve extending through said first sleeve and longitudinally movable relative thereto, a pair of objective holders hingedly mounted on said second sleeve, a pin threaded in said second sleeve and having one end extending therebeyond, an adjusting knob mounted on said one end and providing means for rotating said pin, means providing a flange and groove connection comprising an element mounted on said first sleeve having an exterior flange and a pair of complementary elements mounted on said pin and having interior grooves engaging said flange for preventing longitudinal motion of said pin while permitting rotary movement thereof whereby rotation of said pin by said knob effects longitudinal movement of said second sleeve to move said objective holders relative to said body portions, and a limiting stop on the opposite end of said pin adapted to engage said second sleeve to limit the extended position of the objective holders.

6. In a binocular, a pair of complementary body portions having hubs about the axes of which they are adapted to rotate, a first sleeve having an exterior tapered surface extending through said hubs and mounting said body portions for relative rotary motion, a nut on the smaller diameter portion of said sleeve, a second sleeve extending through said first sleeve and longitudinally movable relatively thereto, a pair of objective holders hingedly mounted on said second sleeve, a pin threaded in said second sleeve and having one end extending therebeyond, an adjusting knob mounted on said one end and providing means for rotating said pin, said nut having an exterior circular flange, a pair of complementary elements having internal grooves engaging the flange on said nut, said elements being received within and maintained in position by the knob after assembly on the pin, said flange and groove connection permitting rotary movement of the pin while preventing longitudinal movement thereof to effect longitudinal movement of the second sleeve as the pin is rotated, and a nut on the opposite end of said pin engageable with the threaded portion of said second sleeve to limit its extended position.

VICTOR E. CARBONARA.

REFERENCES CITED

The following references are of record in the file of this patent:

UNITED STATES PATENTS

| Number | Name | Date |
|---|---|---|
| 1,952,224 | Trautmann et al. | Mar. 27, 1934 |
| 1,965,755 | Warmisham | July 10, 1934 |
| 2,285,388 | Benard | June 9, 1942 |

FOREIGN PATENTS

| Number | Country | Date |
|---|---|---|
| 365,387 | Germany | Dec. 14, 1922 |
| 410,292 | Great Britain | May 17, 1934 |